United States Patent
Ganschow

(10) Patent No.: US 7,967,906 B2
(45) Date of Patent: Jun. 28, 2011

(54) METHOD FOR DIRECTLY PRODUCING FINE-PARTICLE DIKETOPYRROLOPYRROL PIGMENTS

(75) Inventor: Matthias Ganschow, Wiesbaden (DE)

(73) Assignee: Clariant Finance (BVI) Limited, Tortola (VG)

( * ) Notice: Subject to any disclaimer, the term of this patent is extended or adjusted under 35 U.S.C. 154(b) by 5 days.

(21) Appl. No.: 12/530,094

(22) PCT Filed: Feb. 20, 2008

(86) PCT No.: PCT/EP2008/001306
§ 371 (c)(1),
(2), (4) Date: Sep. 4, 2009

(87) PCT Pub. No.: WO2008/107073
PCT Pub. Date: Sep. 12, 2008

(65) Prior Publication Data
US 2010/0121053 A1  May 13, 2010

(30) Foreign Application Priority Data

Mar. 7, 2007 (DE) .................. 10 2007 011 068

(51) Int. Cl.
- C09B 57/00 (2006.01)
- C09B 67/08 (2006.01)
- C09D 5/00 (2006.01)
- G02B 5/22 (2006.01)

(52) U.S. Cl. .................. 106/498; 544/143; 548/453
(58) Field of Classification Search .................. 106/498; 544/143; 548/453
See application file for complete search history.

(56) References Cited

U.S. PATENT DOCUMENTS

| | | | | |
|---|---|---|---|---|
| 4,778,899 A | * | 10/1988 | Pfenninger et al. | 548/453 |
| 4,791,204 A | * | 12/1988 | Jost et al. | 546/101 |
| 4,931,566 A | * | 6/1990 | Surber et al. | 548/453 |
| 5,476,949 A | * | 12/1995 | Wallquist et al. | 548/453 |
| 5,502,208 A | | 3/1996 | Wallquist | |
| 5,914,426 A | * | 6/1999 | Kudschus et al. | 560/204 |
| 6,057,449 A | * | 5/2000 | Hendi | 546/276.7 |
| 6,066,202 A | * | 5/2000 | Wallquist et al. | 106/494 |
| 6,361,594 B1 | * | 3/2002 | Hendi | 106/498 |
| 6,375,732 B1 | * | 4/2002 | Kaul et al. | 106/494 |
| 6,388,093 B1 | * | 5/2002 | Chamberlain et al. | 548/453 |
| 6,723,138 B2 | | 4/2004 | Nickel et al. | |
| 6,918,958 B2 | * | 7/2005 | Weber et al. | 106/493 |
| 7,045,637 B2 | * | 5/2006 | Weber et al. | 548/453 |
| 7,045,638 B2 | * | 5/2006 | Weber et al. | 548/453 |
| 7,102,014 B2 | * | 9/2006 | Weber et al. | 548/453 |
| 7,186,847 B2 | * | 3/2007 | Ruffieux et al. | 548/453 |
| 7,326,793 B2 | * | 2/2008 | Morton et al. | 548/453 |
| 7,695,558 B2 | * | 4/2010 | Ganschow et al. | 106/498 |
| 7,728,139 B2 | * | 6/2010 | Kaul | 546/49 |
| 2001/0008912 A1 | | 7/2001 | Nickel et al. | |
| 2002/0010331 A1 | | 1/2002 | Nickel et al. | |
| 2003/0158410 A1 | | 8/2003 | Nickel et al. | |
| 2003/0162976 A1 | | 8/2003 | Weber et al. | |
| 2003/0162977 A1 | | 8/2003 | Weber et al. | |
| 2004/0060478 A1 | | 4/2004 | Weber et al. | |
| 2004/0177790 A1 | | 9/2004 | Weber et al. | |
| 2009/0142681 A1 | | 6/2009 | Reipen et al. | |

FOREIGN PATENT DOCUMENTS

| | | | |
|---|---|---|---|
| DE | 10106147 A1 | * | 8/2002 |
| EP | 0640604 | | 3/1995 |
| EP | 0962499 | | 12/1999 |
| EP | 1104789 A2 | * | 6/2001 |
| EP | 1162240 | | 12/2001 |
| JP | 01217077 | | 8/1989 |
| JP | 3-26767 A | * | 2/1991 |
| WO | WO 01/04215 | | 1/2001 |
| WO | WO 02/064680 | | 8/2002 |
| WO | WO 03/022848 | | 3/2003 |
| WO | WO2004/076457 A1 | * | 9/2004 |
| WO | WO 2007/045311 | | 4/2007 |

OTHER PUBLICATIONS

U.S. Appl. No. 65/667,519, filed May 20, 2003, Nickel et al.
PCT International Search Report for PCT/EP 2008/001306 Mailed Feb. 27, 2008.
English translation of the International Preliminary Report on Patentability for PCT/EP 2008/001306, Sep. 11, 2009.
English Abstract for JP 03026767, Feb. 5, 1991.
English Abstract for JP 01217077, Aug. 30, 1989.
Wallquist O: "Diketopyrrolopyrrole Pigments" High Performance Pigments, Wiley-VCH, DD, pp. 159-184 XP00908835, Jan. 1, 2002.

* cited by examiner

*Primary Examiner* — Anthony J Green
(74) *Attorney, Agent, or Firm* — Anthony A. Bisulca

(57) ABSTRACT

The invention relates to a method for directly producing fine-particle 1,4-diketopyrrolo[3,4-c]pyrrols of formula (1), wherein $R^{1a}$, $R^{1b}$, $R^{2a}$ and $R^{2b}$ independently represent hydrogen, halogen, $C_1$-$C_4$ alkyl, $C_1$-$C_4$ alkoxy, cyano or phenyl, said compounds being characterized by a maximum frequency distribution between 20 and 120 nm. According to the method, nitriles are reacted with succinic acid esters or lactames or enamines in an alkali medium to form a pigment salt, and then protolysis of the pigment alkali salt is carried out. Said method is characterized in that an effective quantity of a pigment dispersant of formula (II) is added during the protolysis of the pigment alkali salt. In formula (II), Q is a radical of an organic pigment from the group of perinone, quinacridone, quinacridonquinone, anthanthrone, indanthrone, dioxazine, diketopyrrolopyrrol, indigo, thioindigo, thiazineindigo, isoindoline, isoindolinone, pyranthrone, isoviolanthrone, flavanthrone or anthrapyrimidine pigments.

12 Claims, No Drawings

METHOD FOR DIRECTLY PRODUCING FINE-PARTICLE DIKETOPYRROLOPYRROL PIGMENTS

Pigmentary dispersants are pigments substituted with groups having specific activity. Pigmentary dispersants are added to pigments, usually subsequently, in order that dispersion in application media, particularly in coatings, printing colors and liquid inks, may be facilitated and in order that the rheological and coloristic properties of the pigments may be improved. Color strength, transparency and luster/gloss for example can be improved as a result in many applications. Color filters, for example, are manufactured using particularly finely divided pigments in order that particle scattering, which leads to a reduction in contrast ratio, may be substantially foreclosed.

WO 01/04215 discloses finely divided diketopyrrolopyrrole pigments that are characterized by a particularly narrow particle size distribution coupled with high crystallinity and a specific absorption profile. Such a C.I. Pigment Red 254 is obtainable by a crude pigment being initially stirred dry with an inorganic salt at not less than 80° C. and subsequently being exposed to a kneading operation with inorganic salts in the presence of organic solvents.

EP-A-0 962 499 describes a synthesis of diketopyrrolopyrrole pigments wherein the cyclization reaction is carried out in the presence of crystal growth inhibitors. These known processes are the basis of commercial products that are recommended for applications requiring high transparency, color filters for example.

Yet these pigments do not always satisfy all requirements of the industry. More particularly, there is still scope for improvement with regard to transparency, dispersibility and rheology.

It is an object of the present invention to develop a process whereby DPP pigments that have high color strength, high transparency and low viscosity and are useful for color filter applications or high-transparency colorations in particular are obtained ex synthesis, without aftertreatment, such as grinding or salt kneading.

I have found that this object is achieved by the hereinbelow described process, which provides pigments of high color strength, high transparency and low viscosity.

The present invention accordingly provides a process for direct production of finely divided 1,4-diketopyrrolo[3,4-c]pyrroles of formula (I) characterized by a maximum of the frequency distribution of the crystalline particles (mode of the distribution) between 30 and 130 nm, preferably between 40 and 125 nm,

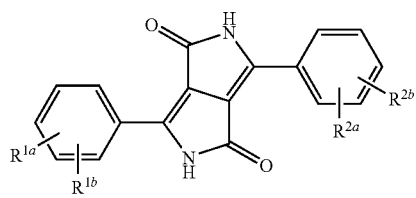

(I)

where $R^{1a}$, $R^{1b}$, $R^{2a}$ and $R^{2b}$ are independently hydrogen, halogen, for example chlorine or bromine, $C_1$-$C_4$-alkyl, for example methyl, ethyl or tert-butyl, $C_1$-$C_4$-alkoxy, for example methoxy, cyano or phenyl; by reaction of nitriles with succinic esters or lactams or enamines in an alkaline amine to form a pigment alkali metal salt and subsequent protolysis of the pigment alkali metal salt, characterized in that it comprises, in the course of the protolysis of the pigment alkali metal salt, adding an effective amount of a pigmentary dispersant of formula (II)

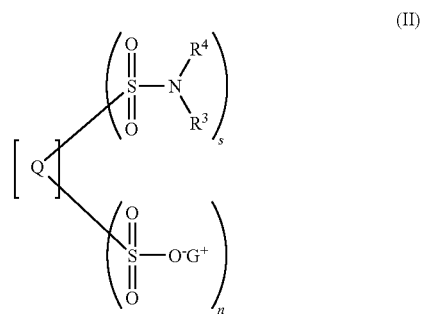

(II)

where

Q is a residue of an organic pigment from the group of the perinone, quinacridone, quinacridonequinone, anthanthrone, indanthrone, dioxazine, for example triphendioxazines, diketopyrrolopyrrole, indigo, thioindigo, thiazineindigo, isoindoline, isoindolinone, pyranthrone, isoviolanthrone, flavanthrone or anthrapyrimidine pigments;

s is from 1 to 5, preferably from 1 to 3;

n is from 0 to 4, preferably from 0.1 to 2; subject to the proviso that the sum total of s and n is from 1 to 5;

$R^3$ is a branched or unbranched, saturated or unsaturated, aliphatic hydrocarbyl radical having 1 to 20 carbon atoms or a $C_5$-$C_7$-cycloalkyl radical or an araliphatic or aromatic radical having 1, 2 or 3 aromatic rings, which rings may be fused or linked by a bond, or a heterocyclic radical having 1, 2 or 3 rings containing 1, 2, 3 or 4 hetero atoms from the group consisting of O, N and S, or a combination thereof; wherein the recited hydrocarbyl, cycloalkyl, aromatics, araliphatics and heteroaromatics radicals may be substituted by 1, 2, 3 or 4 substituents from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $COOR^5$, $CONR^5R^6$, $NR^5R^6$, $SO_3R^5$, $SO_2$—$NR^5R^6$, $SO_3^-E^+$ or $COO^-E^+$, where $R^5$ and $R^6$, which are the same or different, are each hydrogen, phenyl or $C_1$-$C_6$-alkyl;

$R^4$ is hydrogen or $R^3$;

$E^+$, $G^+$ are independently $H^+$ or the equivalent $M^{p+}/m$ of a metal cation $M^{p+}$ from the 1$^{st}$ to 5$^{th}$ main group or from the 1$^{st}$ or 2$^{nd}$ or the 4$^{th}$ to 8$^{th}$ transition group of the periodic table of the chemical elements, where m is one of 1, 2 or 3 and p is 1, 2 or 3; or a substituted or unsubstituted ammonium ion.

When $E^+$ and/or $G^+$ are an ammonium ion, possibilities include:

(i) $NR^7R^8R^9R^{10}$, where the substituents $R^7$, $R^8$, $R^9$ and $R^{10}$ are each independently a hydrogen atom, $C_1$-$C_{30}$-alkyl, $C_2$-$C_{30}$-alkenyl, $C_5$-$C_{30}$-cycloalkyl, phenyl, ($C_1$-$C_8$)-alkylphenyl, ($C_1$-$C_4$)-alkylenephenyl, or a (poly)alkyleneoxy group of the formula —[CH($R^{11}$)—CH($R^{11}$)—O]$_k$—H, where k is from 1 to 30 and the two $R^{11}$ radicals are independently hydrogen, $C_1$-$C_4$-alkyl or, when k is >1, a combination thereof;

and wherein alkyl, alkenyl, cycloalkyl, phenyl or alkylphenyl $R^7$, $R^8$, $R^9$ and/or $R^{10}$ may each be substituted by amino, hydroxyl and/or carboxyl;

or where the substituents $R^7$ and $R^8$ may combine with the quaternary nitrogen atom to form a five- to seven-membered saturated ring system which optionally contains still further hetero atoms from the group consisting of O, S and N;

or where the substituents $R^7$, $R^8$ and $R^9$ may combine with the quaternary nitrogen atom to form a five- to seven-membered aromatic ring system which optionally contains still further hetero atoms from the group consisting of O, S and N and to which additional rings may optionally be fused;

or (ii) an ammonium ion of formula (IIIa)

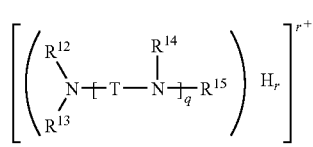

(IIIa)

where $R^{12}$, $R^{13}$, $R^{14}$ and $R^{15}$ are independently hydrogen or a (poly) alkyleneoxy group of the formula —[CH($R^{11}$)—CH($R^{11}$) O]$_k$—H, where k and $R^{11}$ are each as defined above;

q is from 1 to 10;

r is from 1 to 5 subject to the proviso that r is $\leq$q+1;

T is a branched or unbranched $C_2$-$C_6$-alkylene radical; or wherein T may also be a combination of branched and unbranched $C_2$-$C_6$-alkylene radicals when q is >1.

In preferred pigmentary dispersants of formula (II)

Q is a residue of an organic pigment from the group of the quinacridone, dioxazine or diketopyrrolopyrrole pigments;

$R^3$ is $C_1$-$C_6$-alkyl, benzyl, phenyl, which may each be substituted by 1, 2, 3 or 4 substituents from the group consisting of OH, $C_1$-$C_6$-alkoxy, S—$C_1$-$C_6$-alkyl, $NHCONH_2$, NHC($NH$)$NH_2$, NHCO—$C_1$-$C_6$-alkyl, $COOR^5$, $CONR^5R^6$, $NR^5R^6$, $SO_3R^5$, $SO_2$—$NR^5R^6$, $SO_3^-E^+$ or $COO^-E^+$, where $R^5$ and $R^6$, which are the same or different, are each hydrogen, phenyl or $C_1$-$C_6$-alkyl;

$R^4$ is hydrogen, $E^+$, $G^+$ are each hydrogen, an alkaline earth metal or an alkali metal or a metal of the third main group, particularly Li, Na, K, Ca, Sr, Ba, Al, or an ammonium ion.

In particularly preferred pigmentary dispersants of formula (II)

Q is a residue of an organic pigment from the group of the diketopyrrolopyrrole pigments, preferably P.R. 255 or P.R. 264, $R^3$ is $C_1$-$C_6$-alkyl, which may be substituted by 1, 2, 3 or 4 substituents from the group consisting of $NHCONH_2$, $NHC(NH)NH_2$, NHCO—$C_1$-$C_6$-alkyl, $COOR^5$, $NR^5R^6$, $COO^-E^+$, where $R^5$ and $R^6$, which are the same or different, are each hydrogen, phenyl or $C_1$-$C_6$-alkyl;

$R^4$ is hydrogen, $E^+$, $G^+$ are each hydrogen, an alkaline earth metal or an alkali metal or a metal of the third main group, particularly Li, Na, K, Ca, Sr, Ba, Al or an ammonium ion.

The pigmentary dispersants of formula (II) are compounds known per se and are obtainable by following known processes, for example as described in EP-A-1 104 789, JP 03026767 or WO 02/064 680.

Particular preference is given to pigments of formula (I) where $R^{1b}$ and $R^{2b}$ are each hydrogen, and $R^{1a}$ and $R^{2a}$ are the same or different and are each hydrogen, methyl, tert-butyl, chlorine, cyano or phenyl.

Examples of preferred pigments of formula (I) are C.I. Pigment Orange 71, 73, 81, Pigment Red 254, 255, 264, 270, 272.

A preferred embodiment of the process of the present invention is characterized by reaction of 1 mol of a dicyclohexyl succinate, dialkyl succinate, monoalkyl monophenyl succinate or diphenyl succinate ester in which alkyl in the succinyl radical is $C_1$-$C_{18}$-alkyl and phenyl in the succinyl radical is unsubstituted phenyl or phenyl substituted by one or two $C_1$-$C_6$-alkyl or $C_1$-$C_6$-alkoxy groups, with 2 mol of a mixture of nitriles of the formulae $R^{1a}R^{1b}C_6H_3$—CN and $R^{2a}R^{2b}C_6H_3$—CN, where $R^{1a}$, $R^{1b}$, $R^{2a}$ and $R^{2b}$ are each as defined above, the molar ratio between $R^{1a}R^{1b}C_6H_3$—CN and $R^{2a}R^{2b}C_6H_3$—CN in the nitrile mixture being in the range from 100:0 to 50:50;

or by reaction of 1 mol of a lactam of formula (III) or of an enamine of formula (IV)

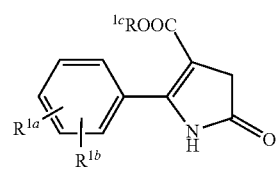

(III)

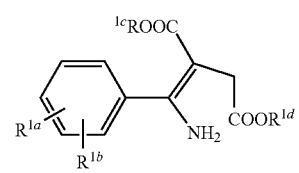

(IV)

with one mole of a nitrile of the formula $R^{2a}R^{2b}C_6H_3$—CN;

where $R^{1a}$, $R^{1b}$, $R^{2a}$ and $R^{2b}$ are each as defined above and $R^{1c}$ and $R^{1d}$ are each alkyl or aryl, preferably $C_1$-$C_{18}$-alkyl or $C_6$-$C_{10}$-aryl;

in an inert organic solvent in the presence of an alkali metal or of an alkali metal alkoxide as a strong base at elevated temperature to form a pigment alkali metal salt and subsequent release of a compound of formula (I) by protolysis which is characterized in that the pigment alkali metal salt and also a pigmentary dispersant of formula (II) are added to a liquid protolysis medium, or the pigment alkali metal salt is added to a liquid protolysis medium in which a pigmentary dispersant of formula (II) has been dissolved or suspended, the amount added of the pigmentary dispersant of formula (II) being at least 0.05% by weight, based on the weight of the pigment of formula (I).

The pigment salt suspension formed can be protolyzed using water or a mixture of water with an alcohol having 1 to 4 carbon atoms, such as methanol or ethanol, and or with an acid. Useful acids include for example aliphatic or aromatic carboxylic or sulfonic acids, for example formic acid, acetic acid, propionic acid, oxalic acid, benzoic acid or benzenesulfonic acid. Useful acids further include mineral acids, such as hydrochloric acid, sulfuric acid or phosphoric acid. Particular preference is given to neutral water, a mixture of methanol and water or water at pH<5.

The weight ratio of pigment of formula (I) to pigmentary dispersant of formula (II) is preferably between (99.9 to 0.1) and (80 to 20), more preferably between (97 to 3) and (83 to 17) and most preferably between (95 to 5) and (85 to 15).

"Direct" production of finely divided pigments is intended to mean that the pigments obtained from the process of the present invention are already sufficiently finely divided and also efficiently dispersible and no longer require any subsequent comminuting step.

The synthesis up to the pigment alkali metal salt stage can be effected by following known methods and the customary conditions, as described in EP-A-0 962 499 for example.

The protolysis in the presence of pigmentary dispersant (II) is advantageously carried out at a temperature of 20 to 120° C. for the pigment alkali metal salt, preferably at a temperature of 40 to 90° C. for the pigment alkali metal salt. The liquid protolysis medium preferably has a temperature of 0 to 60° C., particularly 0 to 30° C.

The amount of protolysis medium shall be determined such that complete protolysis of the pigment alkali metal salt and of the alkoxide used is ensured. Advantageously, a comparatively large excess of protolysis medium is used.

Further customary auxiliaries or admixtures can be added in the course of the process of the present invention or afterwards, examples being surfactants, dispersants, fillers, standardizers, resins, waxes, defoamers, antidusters, extenders, antistats, preservatives, dryness retarders, wetters, antioxidants, UV absorbers and light stabilizers, preferably in an amount of 0.1% to 10% by weight, particularly 0.5% to 5% by weight, based on the total weight of the pigment.

Useful surfactants include anionic or anion-active, cationic or cation-active and nonionic or amphoteric substances or mixtures thereof.

The classes of compounds described in the international application PCT/EP 2006/008866 can serve as examples of such surfactants.

The pigment preparation produced according to the present invention may preferably be used as aqueous presscake, dry powder or dry granulate, but generally what is concerned are solid systems of pulverulent constitution.

A moist pigment preparation may be dried using the familiar drying assemblies, such as drying cabinets, paddle wheel dryers, tumble dryers, contact dryers and, in particular, spin flash and spray dryers.

The pigment preparations produced according to the present invention are notable for their excellent coloristic and rheological properties, in particular high flocculation stability, easy dispersibility, good rheology, high color strength, transparency and saturation (chroma). They are easily dispersed and very finely dispersible in many application media. Such pigment dispersions display excellent rheological properties even at high pigmentation of varnish or printing ink/color concentrates. Other properties, for example gloss/luster, overcoating fastness, solvent fastness, alkali and acid fastness, light and weather fastnesses and high cleanness of hue are also very good. In addition, the pigment preparations of the present invention provide hues in the red region which are in demand for use in color filters. There they ensure high contrast and also meet the other requirements for use in color filters, such as high thermal stability or steep and narrow absorption bands. The full width at half maximum is preferably 40 to 100 nm, particularly 50 to 85 nm, for the pigments produced according to the present invention.

The pigment preparations produced according to the present invention are in principle useful for pigmenting any high molecular weight organic materials of natural or synthetic origin, for example plastics, resins, coatings, particularly metallic coatings, paints, electrophotographic toners and developers, electret materials, color filters and also liquid inks, printing inks/colors.

More particularly, the pigment preparations produced according to the present invention are useful as colorants in ink-jet inks, whether waterborne or non-waterborne, and also in ink-jet inks of the hot-melt type.

More particularly, the pigment preparations produced according to the invention are also useful as colorants for color filters, not only for additive color generation but also for subtractive color generation, for example in electro-optical systems such as television screens, liquid crystal displays (LCDs), charge coupled devices, plasma displays or electroluminescent displays, which in turn can be active (twisted nematic) or passive (supertwisted nematic) ferroelectric displays or light-emitting diodes, and also as colorants for "electronic inks" ("e-inks") or "electronic paper" ("e-paper").

When used in the manufacture of color filters, whether of the reflecting type or of the transparent type, pigments are applied in the form of a paste or as pigmented photoresists in suitable binders (acrylates, acrylic esters, polyimides, polyvinyl alcohols, epoxies, polyesters, melamines, gelatin, caseines) atop the respective LCD components (for example TFT-LCD=Thin Film Transistor Liquid Crystal Displays or for example ((S) TN-LCD=(Super) Twisted Nematic LCD). High pigment purity/cleanness is a prerequisite for a stable paste/pigmented photoresist as well as high thermal stability. In addition, the pigmented color filters can also be applied by ink jet printing processes or other suitable printing processes.

The red hues of the pigment preparation of the present invention are very particularly useful for the color filter color set of red-green-blue (R,G,B). These three colors are present side by side as separate colored dots and illuminated from the back combine to produce a full color picture.

Typical colorants for the red colored dot are pyrrolopyrrole, quinacridone and azo pigments, for example C.I. Pigment Red 254, C.I. Pigment Red 209, C.I. Pigment Red 175 and C.I. Pigment Orange 38, individually or mixed. The green colored dot typically utilizes phthalocyanine colorants, for example C.I. Pigment Green 36 and C.I. Pigment Green 7.

Shading colors may be admixed to the respective color dots if desired. The red and green hue is preferably admixed with yellow, for example with C.I. Pigment Yellow 138,139,150, 151,180 and 213.

In the examples which follow, percentages and parts are by weight, unless otherwise stated.

To determine the transparency, the pigmented alkyd-melamine baking finish was applied as a masstone coating to a white piece of cardboard showing a black bar side by side together with the sample to be compared, air dried for 30 min and then baked at 140° C. for 30 min. Transparency was evaluated by comparing the hiding power of the two applied pigments on top of the black background.

To determine the maximum of the frequency distribution (the mode of the distribution) of the crystalline particles, the pigments obtained were fully dispersed in an alkyd-melamine varnish system and the frequency distribution in this varnish system was determined by means of a disc centrifuge.

Measuring Apparatus:

The measurements were carried out using DC24000 and DC20000 disc centrifuges from CPS Instruments, Inc., Stuart, Fla. 34997, USA.

To obtain stable sedimentation characteristics, a density gradient was established in the spin fluid of the disc centrifuge. The density gradient was established by mixing 40% to 60% by weight of xylene with the abovementioned varnish base of the alkyd-melamine varnish/coating system.

Conduct of Measurement and Evaluation:

Following attainment of the nominal speed of 16 000 $min^{-1}$, charge 15 ml of spin fluid with density gradient into the centrifuge disc. Inject 0.1 ml sample (pigment fully dispersed in alkyd-melamine varnish/coating system). Record the sedimentation curve and use the CPS software to calculate the particle size volume distribution. Correct evaluation taking into account Mie theory requires the complex fractive index of the pigment. It was determined for 2 samples by ellipsometry on pressed tablets at L.O.T. Oriel GmbH of Darmstadt. The similarly required density of the pigment particles was determined using a Micromeritics AccuPyc 1330 gas pyknometer.

COMPARATIVE EXAMPLE 1

Comparative Example, Precipitation without Pigmentary Dispersant 31 parts of 4-chlorobenzonitrile are introduced into 30% sodium amoxide (prepared from 9.3 parts of sodium and 143 parts of amyl alcohol) and heated to 100° C. 30 parts of diisopropyl succinate are added within two hours and the pigment salt suspension obtained is subsequently stirred at 100° C. for a further four hours.

The thereby obtained disodium salt of the pigment is converted into the pigment by hydrolysis of the hot disodium salt suspension, cooled to 80° C., by pouring onto 420 parts of neutral water.

Isolation and washing with methanol and water gives a pigment which has a maximum of the frequency distribution (the mode of the distribution) of the crystalline particles at 167 nm. The BET surface area of the pigment is 63 $m^2/g$.

COMPARATIVE EXAMPLE 2

Similar to EP-A-962 499

31 parts of 4-chlorobenzonitrile and 1.8 parts of the pigmentary dispersant (V)

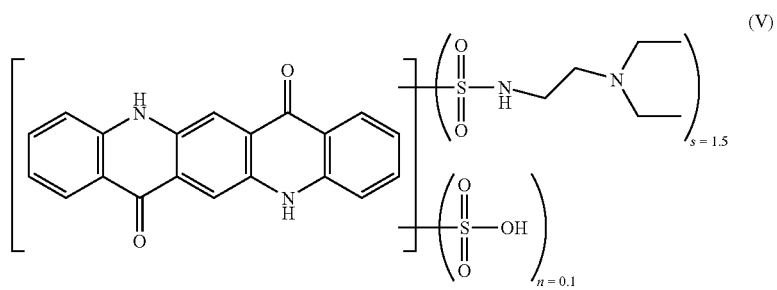

are introduced into 30% sodium amoxide (prepared from 9.3 parts of sodium and 143 parts of amyl alcohol) and heated to 100° C. 30 parts of diisopropyl succinate are added within two hours and the pigment alkali metal salt suspension obtained is subsequently stirred at 100° C. for a further four hours.

The thereby obtained disodium salt of the pigment is converted into the pigment by hydrolysis of the hot disodium salt suspension, cooled to 80° C., by pouring onto 420 parts of neutral water at 40° C.

Isolation and washing with methanol and water gives a pigment which has a maximum of the frequency distribution (the mode of the distribution) of the crystalline particles at 190 nm. The BET surface area of the pigment is 81 $m^2/g$.

COMPARATIVE EXAMPLE 3

Similar to EP-A-962 499

31 parts of 4-chlorobenzonitrile and 1.8 parts of the pigmentary dispersant (VI)

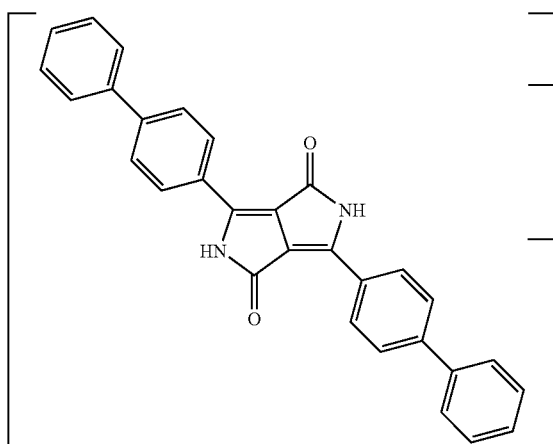
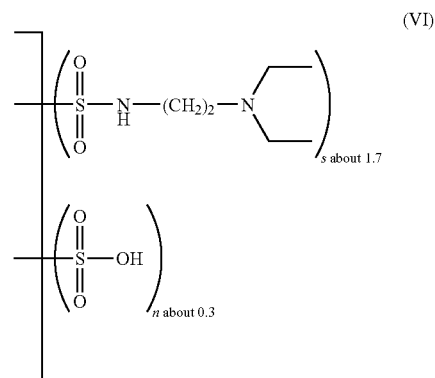

(VI)

are introduced into 30% sodium amoxide (prepared from 9.3 parts of sodium and 143 parts of amyl alcohol) and heated to 100° C. 30 parts of diisopropyl succinate are added within two hours and the pigment alkali metal salt suspension obtained is subsequently stirred at 100° C. for a further four hours.

The thereby obtained disodium salt of the pigment is converted into the pigment by hydrolysis of the hot disodium salt suspension, cooled to 80° C., by pouring onto 420 parts of neutral water.

Isolation and washing with methanol and water gives a pigment which has a maximum of the frequency distribution (the mode of the distribution) of the crystalline particles at 140 nm. The BET surface area of the pigment is 88 m²/g.

EXAMPLE 1

The pigment is prepared similarly to comparative example 1 except that the disodium salt of the pigment is converted into the pigment by hydrolysis of the hot disodium salt suspension at 80° C. by pouring onto 420 parts of neutral water in which 3.7 parts of the pigmentary dispersant (VI) have been dispersed. Isolation and washing with methanol and water gives a pigment which has a maximum of the frequency distribution (the mode of the distribution) of the crystalline particles at 79 nm and a full width at half maximum of the frequency distribution of 58 nm. The BET surface area of the pigment is 130 m²/g.

EXAMPLE 2

The pigment is prepared similarly to example 1 except that 1.8 parts of the pigmentary dispersant (VI) have been dispersed in the water.

Isolation and washing with methanol and water gives a pigment which has a maximum of the frequency distribution (the mode of the distribution) of the crystalline particles at 110 nm and a full width at half maximum of the frequency distribution of 63 nm. The BET surface area of the pigment is 100 m²/g.

EXAMPLE 3

The pigment is prepared similarly to example 1 except that 3.7 parts of the pigmentary dispersant (VII) have been dispersed in the water.

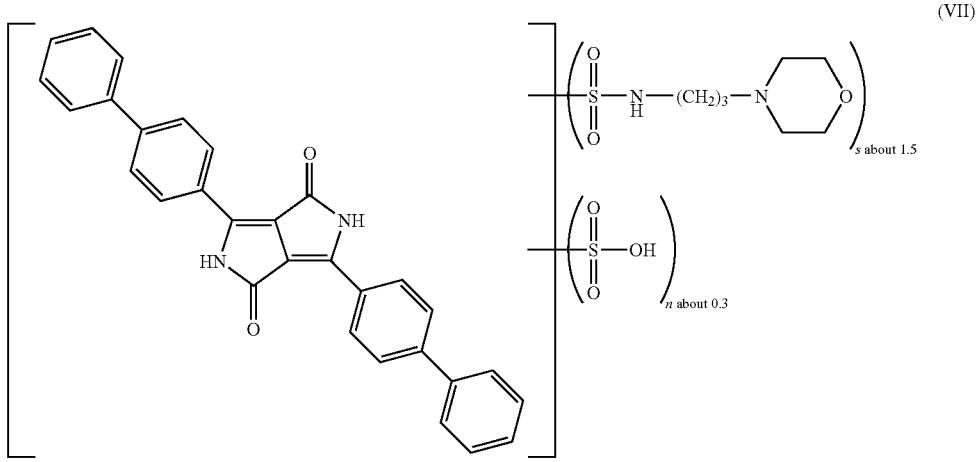

(VII)

Isolation and washing with methanol and water gives a pigment which has a maximum of the frequency distribution (the mode of the distribution) of the crystalline particles at 100 nm and a full width at half maximum of the frequency distribution of 79 nm. The BET surface area of the pigment is 107 m²/g.

EXAMPLE 4

The pigment is prepared similarly to example 3 except that 1.8 parts of the pigmentary dispersant (VII) have been dispersed in the water.

Isolation and washing with methanol and water gives a pigment which has a maximum of the frequency distribution (the mode of the distribution) of the crystalline particles at 110 nm and a full width at half maximum of the frequency distribution of 89 nm. The BET surface area of the pigment is 93 m²/g.

EXAMPLE 5

The pigment is prepared similarly to example 1 except that 3.7 parts of the pigmentary dispersant (VIII) have been dispersed in the water.

distribution of 85 nm. The BET surface area of the pigment is 95 m²/g.

EXAMPLE 6

The pigment is prepared similarly to example 5 except that 1.8 parts of the pigmentary dispersant (VIII) have been dispersed in the water.

Isolation and washing with methanol and water gives a pigment which has a maximum of the frequency distribution (the mode of the distribution) of the crystalline particles at 121 nm and a full width at half maximum of the frequency distribution of 93 nm. The BET surface area of the pigment is 91 m²/g.

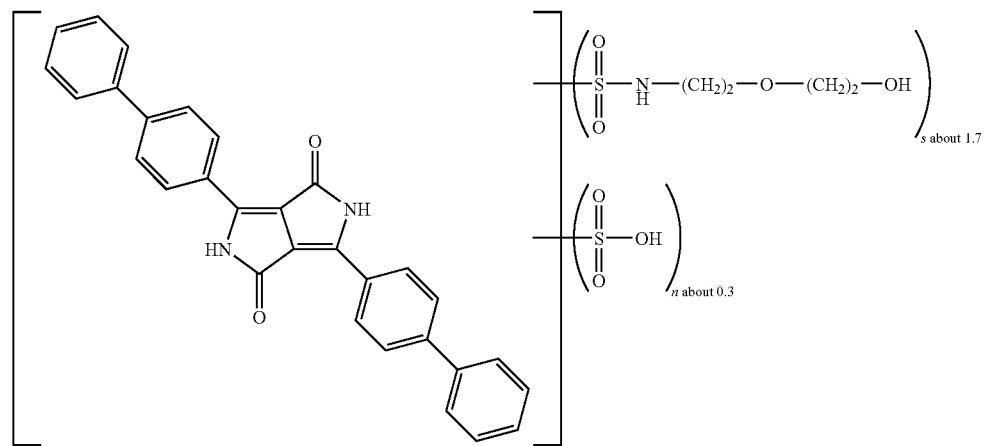

Isolation and washing with methanol and water gives a pigment which has a maximum of the frequency distribution (the mode of the distribution) of the crystalline particles at 118 nm and a full width at half maximum of the frequency

EXAMPLE 7

The pigment is prepared similarly to example 1 except that 3.7 parts of the pigmentary dispersant (IX) have been dispersed in the water.

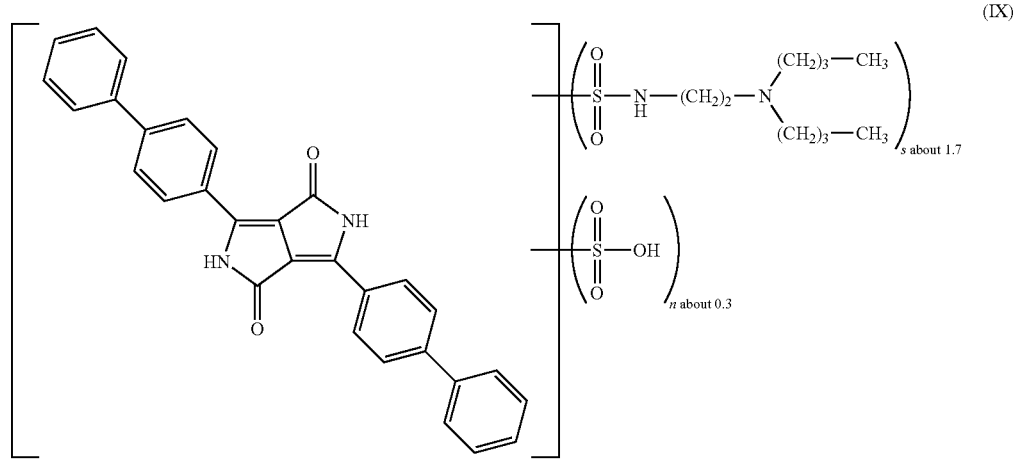

Isolation and washing with methanol and water gives a pigment which has a maximum of the frequency distribution (the mode of the distribution) of the crystalline particles at 89 nm and a full width at half maximum of the frequency distribution of 57 nm. The BET surface area of the pigment is 115 m²/g.

EXAMPLE 8

The pigment is prepared similarly to example 7 except that 1.8 parts of the pigmentary dispersant (IX) have been dispersed in the water.

Isolation and washing with methanol and water gives a pigment which has a maximum of the frequency distribution (the mode of the distribution) of the crystalline particles at 95 nm and a full width at half maximum of the frequency distribution of 67 nm. The BET surface area of the pigment is 107 m²/g.

EXAMPLE 9

The pigment is prepared similarly to example 1 except that 3.7 parts of the pigmentary dispersant (X) have been dispersed in the water.

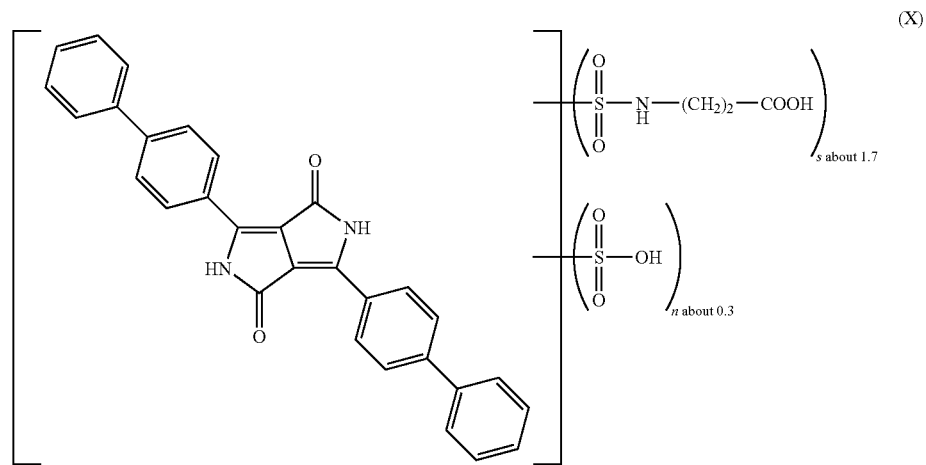

Isolation and washing with methanol and water gives a pigment which has a maximum of the frequency distribution (the mode of the distribution) of the crystalline particles at 120 nm and a full width at half maximum of the frequency distribution of 99 nm. The BET surface area of the pigment is 85 m²/g.

EXAMPLE 10

The pigment is prepared similarly to example 1 except that 3.7 parts of the pigmentary dispersant (XI) have been dispersed in the water.

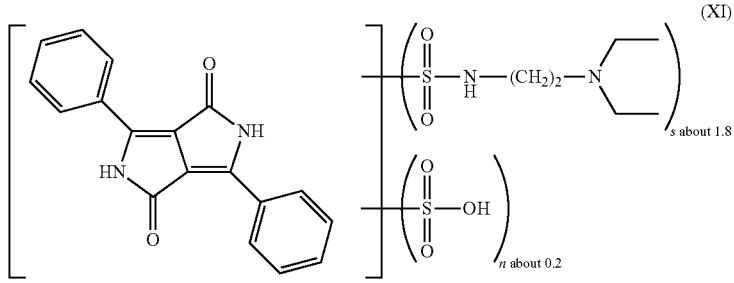

Isolation and washing with methanol and water gives a pigment which has a maximum of the frequency distribution (the mode of the distribution) of the crystalline particles at 82 nm and a full width at half maximum of the frequency distribution of 62 nm. The BET surface area of the pigment is 124 m$^2$/g.

EXAMPLE 11

The pigment is prepared similarly to example 10 except that 1.8 parts of the pigmentary dispersant (XI) have been dispersed in the water.

Isolation and washing with methanol and water gives a pigment which has a maximum of the frequency distribution (the mode of the distribution) of the crystalline particles at 91 nm and a full width at half maximum of the frequency distribution of 65 nm. The BET surface area of the pigment is 109 m$^2$/g.

EXAMPLE 12

The pigment is prepared similarly to example 1 except that the disodium salt of the pigment is converted into the pigment by hydrolysis of the hot disodium salt suspension at 80° C. by pouring onto 420 parts of neutral water in which 3.7 parts of the pigmentary dispersant (V) have been dispersed.

Isolation and washing with methanol and water gives a pigment which has a maximum of the frequency distribution (the mode of the distribution) of the crystalline particles at 125 nm and a full width at half maximum of the frequency distribution of 94 nm. The BET surface area of the pigment is 92 m$^2$/g.

EXAMPLE 13

The pigment is prepared similarly to example 12 except that 1.8 parts of the pigmentary dispersant (V) have been dispersed in the water.

Isolation and washing with methanol and water gives a pigment which has a maximum of the frequency distribution (the mode of the distribution) of the crystalline particles at 121 nm and a full width at half maximum of the frequency distribution of 85 nm. The BET surface area of the pigment is 91 m$^2$/g.

The transparency in an alkyd-melamine baking finish of the pigments obtained in the preceding examples is reported in the table below: The pigment of comparative example 1 was used as standard for the transparency. Transparency was assessed as follows:

| | |
|---|---|
| +VI | significantly more hiding |
| +V | substantially more hiding |
| +IV | distinctly more hiding |
| +III | markedly more hiding |
| +II | somewhat more hiding |
| +I | a trace more hiding |
| /=/ | approximately equal to |
| −I | a trace more transparent |
| −II | somewhat more transparent |
| −III | markedly more transparent |
| −IV | distinctly more transparent |
| −V | substantially more transparent |
| −VI | significantly more transparent |

| Sample | Transparency |
|---|---|
| Comparative example 1 | Reference |
| Comparative example 2 | −I/a trace more transparent |
| Comparative example 3 | −II/somewhat more transparent |
| Example 1 | −VI/significantly more transparent |
| Example 2 | −V/substantially more transparent |
| Example 3 | −V/substantially more transparent |
| Example 4 | −V/substantially more transparent |
| Example 5 | −VI/significantly more transparent |
| Example 6 | −V/substantially more transparent |
| Example 7 | −VI/significantly more transparent |
| Example 8 | −VI/significantly more transparent |
| Example 9 | −IV/distinctly more transparent |
| Example 10 | −V/substantially more transparent |
| Example 11 | −V/substantially more transparent |
| Example 12 | −IV/distinctly more transparent |
| Example 13 | −IV/distinctly more transparent |

I claim:
1. A process for direct production of finely divided 1,4-diketopyrrolo[3,4-c]pyrroles of formula (I) wherein a maximum of the frequency distribution of the crystalline particles of the 1,4-diketopyrrolo[3,4-c]pyrroles of formula (I) is between 30 and 130 nm,

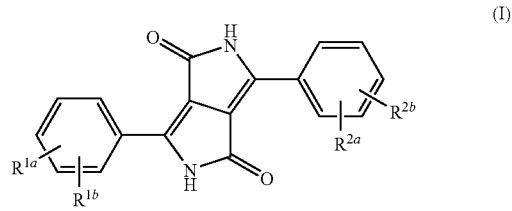

wherein $R^{1a}$, $R^{1b}$, $R^{2a}$ and $R^{2b}$ are independently hydrogen, halogen, $C_1$-$C_4$-alkyl, $C_1$-$C_4$-alkoxy, cyano or phenyl; comprising the steps of reacting 1 mol of a dicyclohexyl succinate, dialkyl succinate, monoalkyl monophenyl succinate or diphenyl succinate ester in which the alkyl in the succinyl radical is $C_1$-$C_{18}$-alkyl and the phenyl in the succinyl radical is unsubstituted phenyl or phenyl substituted by one or two $C_1$-$C_6$-alkyl or $C_1$-$C_6$-alkoxy groups, with 2 mol of a mixture of nitriles of the formulae $R^{1a}R^{1b}C_6H_3$—CN and $R^{2a}R^{2b}C_6H_3$—CN, the molar ratio between $R^{1a}R^{1b}C_6H_3$—CN and $R^{2a}R^{2b}C_6H_3$—CN in the nitrile mixture being in the range from 100:0 to 50:50;

or reacting 1 mol of a lactam of formula (III) or of an enamine of formula (IV)

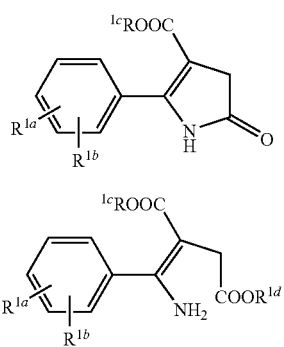

with one mole of a nitrile of the formula $R^{2a}R^{2b}C_6H_3$—CN; wherein $R^{1c}$ and $R^{1d}$ are each alkyl or aryl;

in an inert organic solvent in the presence of an alkali metal or of an alkali metal alkoxide as a strong base at elevated temperature to form a pigment alkali metal salt and subsequently releasing a compound of formula (I) by protolysis, wherein the protolysis is characterized in that the pigment alkali metal salt is added to a liquid protolysis medium in which a pigmentary dispersant of formula (II) has been dissolved or suspended, wherein the amount added of the pigmentary dispersant of formula (II) is at least 0.05% by weight, based on the weight of the pigment of formula (I)

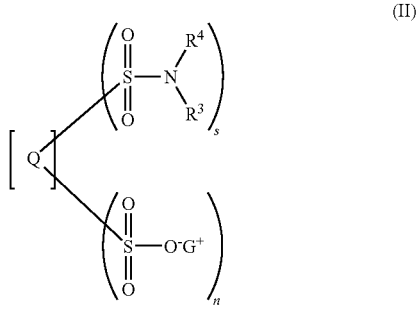

wherein

Q is a residue of an organic pigment selected from the group consisting of perinone, quinacridone, quinacridonequinone, anthanthrone, indanthrone, dioxazine, diketopyrrolopyrrole, indigo, thioindigo, thiazineindigo, isoindoline, isoindolinone, pyranthrone, isoviolanthrone, flavanthrone and anthrapyrimidine pigments;

s is from 1 to 5;

n is from 0 to 4; subject to the proviso that the sum total of s and n is from 1 to 5;

$R^3$ is a branched or unbranched, saturated or unsaturated, aliphatic hydrocarbyl radical having 1 to 20 carbon atoms or a $C_5$-$C_7$-cycloalkyl radical or an araliphatic or aromatic radical having 1, 2 or 3 aromatic rings, wherein the aromatic rings are optionally fused or linked by a bond, or a heterocyclic radical having 1, 2 or 3 rings containing 1, 2, 3 or 4 hetero atoms selected from the group consisting of O, N S and a combination thereof; wherein the hydrocarbyl, cycloalkyl, aromatics, araliphatics and heteroaromatics radicals are optionally substituted by 1, 2, 3 or 4 substituents selected from the group consisting of OH, CN, F, Cl, Br, $NO_2$, $CF_3$, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $CONR^5R^6$, $NR^5R^6$ and $SO_2$—$NR^5R^6$, where $R^5$ and $R^6$, which are the same or different, are each hydrogen, phenyl or $C_1$-$C_6$-alkyl;

$R^4$ is hydrogen or $R^3$;

$G^+$ is $H^+$ or the equivalent $M^{p+}/m$ of a metal cation $M^{p+}$ from the $1^{st}$ to $5^{th}$ main group or from the $1^{st}$ or $2^{nd}$ or the $4^{th}$ to $8^{th}$ transition group of the periodic table of the chemical elements, where m is one of 1, 2 or 3 and p is 1, 2 or 3; or a substituted or unsubstituted ammonium ion.

2. The process as claimed in claim 1, wherein $R^{1a}$, $R^{1b}$, $R^{2a}$ and $R^{2b}$ are independently hydrogen, chlorine, bromine, methyl, ethyl, tert-butyl, methoxy, cyano or phenyl.

3. The process as claimed in claim 1, wherein the pigment of formula (I) is C.I. Pigment Orange 71, 73, 81, Pigment Red 254, 255, 264, 270 or 272.

4. The process as claimed in claim 1, wherein

Q is a residue of an organic pigment selected from the group consisting of quinacridone, dioxazine and diketopyrrolopyrrole pigments;

$R^3$ is $C_1$-$C_6$-alkyl, benzyl, phenyl, each of which is optionally substituted by 1, 2, 3 or 4 substituents selected from the group consisting of OH, $C_1$-$C_6$-alkoxy, S—$C_1$-$C_6$-alkyl, $NHCONH_2$, $NHC(NH)NH_2$, NHCO—$C_1$-$C_6$-alkyl, $C_1$-$C_6$-alkyl, $CONR^5R^6$, $NR^5R^6$ and $SO_2$—$NR^5R^6$, wherein $R^5$ and $R^6$ are the same or different, and are hydrogen, phenyl or $C_1$-$C_6$-alkyl;

$R^4$ is hydrogen, $G^+$ are each hydrogen, an alkaline earth metal, an alkali metal, a metal of the third main group, or an ammonium ion.

5. The process as claimed in claim 1, wherein

Q is a residue of an organic pigment and wherein the organic pigment is C.I. Pigment Red 255 or C.I. Pigment Red 264;

$R^3$ is $C_1$-$C_6$-alkyl, optionally substituted by 1, 2, 3 or 4 substituents selected from the group consisting of $NHCONH_2$, $NHC(NH)NH_2$, NHCO—$C_1$-$C_6$-alkyl, and $NR^5R^6$, wherein $R^5$ and $R^6$ are the same or different, and are each hydrogen, phenyl or $C_1$-$C_6$-alkyl;

$R^4$ is hydrogen, $G^+$ are each hydrogen, Li, Na, K, Ca, Sr, Ba, Al or an ammonium ion.

6. The process as claimed in claim 1, wherein the protolysis medium is water, an aqueous solution of an acid, a lower alcohol or a combination thereof.

7. The process as claimed in claim 1, wherein the protolysis medium is neutral water, a mixture of methanol and water or water at pH<5.

8. The process as claimed in claim 1, wherein the weight ratio of pigment of formula (I) to the pigmentary dispersant of formula (II) is between 99.9 to 0.1 and 80 to 20.

9. The process as claimed in claim 1, wherein the weight ratio of pigment of formula (I) to pigmentary dispersant of formula (II) is between 95 to 5 and 85 to 15.

10. The process as claimed in claim 1, wherein the protolysis is carried out at a temperature of 20 to 120° C. for the pigment alkali metal salt.

11. The process as claimed in claim 1, wherein the liquid protolysis medium has a temperature of 0 to 60° C.

12. The process as claimed in claim 1, wherein $R^{1c}$ and $R^{1d}$ are $C_1$-$C_{18}$-alkyl or $C_6$-$C_{10}$-aryl.

* * * * *